US009512244B2

United States Patent
Ramjoie et al.

(10) Patent No.: US 9,512,244 B2
(45) Date of Patent: Dec. 6, 2016

(54) PROCESS FOR PREPARING A CATALYST COMPONENT FOR PROPYLENE POLYMERIZATION

(75) Inventors: Yves Johann Elizabeth Ramjoie, Hermalle-Sous-Argenteau (BE); Mark Vlaar, Roermond (NL); Nicolaas Hendrika Friederichs, Brunssum (NL); Sergei Andreevich Sergeev, Novosibirsk (RU); Vladimir Aleksandrovich Zakharov, Novosibirsk (RU); Gennadii Dimitrievich Bukatov, Novosibirsk (RU); Mansour Taftaf, Riyadh (SA); Atieh Aburaqabah, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 481 days.

(21) Appl. No.: 12/227,663

(22) PCT Filed: May 23, 2007

(86) PCT No.: PCT/EP2007/004572
§ 371 (c)(1),
(2), (4) Date: Feb. 23, 2009

(87) PCT Pub. No.: WO2007/134851
PCT Pub. Date: Nov. 29, 2007

(65) Prior Publication Data
US 2009/0306315 A1 Dec. 10, 2009

(30) Foreign Application Priority Data
May 24, 2006 (EP) .................................... 06010720

(51) Int. Cl.
*B01J 31/00* (2006.01)
*B01J 37/00* (2006.01)
*B01J 21/00* (2006.01)
*C08F 4/44* (2006.01)
*C08F 4/06* (2006.01)
*C08F 4/42* (2006.01)
*C08F 4/02* (2006.01)
*C08F 4/60* (2006.01)
*C08F 10/00* (2006.01)
*C08F 110/06* (2006.01)

(52) U.S. Cl.
CPC ............. *C08F 10/00* (2013.01); *C08F 110/06* (2013.01)

(58) Field of Classification Search
CPC ............. C08F 4/44; C08F 4/06; C08F 4/42; C08F 4/02; C08F 4/60; B01J 31/00; B01J 37/00; B01J 21/06
USPC ..................................................... 526/124.3
See application file for complete search history.

(56) References Cited

U.S. PATENT DOCUMENTS

| 4,232,139 A | 11/1980 | Minami et al. |
| 4,315,835 A | 2/1982 | Scata' et al. |
| 4,728,705 A * | 3/1988 | Nestlerode et al. ........ 526/125.3 |
| 4,771,023 A | 9/1988 | Sasaki et al. |
| 5,132,261 A * | 7/1992 | Murata et al. ................ 502/116 |
| 5,229,324 A | 7/1993 | Turner et al. |
| 5,229,342 A | 7/1993 | Job |
| 5,262,573 A | 11/1993 | Smith et al. |
| 6,320,009 B1 * | 11/2001 | Nakano ................... C08F 10/00 526/351 |
| 6,962,889 B2 * | 11/2005 | Zhu et al. ...................... 502/118 |
| 7,947,788 B2 * | 5/2011 | Ramjoie et al. ........... 526/124.2 |
| 2001/0014765 A1 * | 8/2001 | Fujiwara et al. ............. 585/700 |

(Continued)

FOREIGN PATENT DOCUMENTS

EP 0268274 A2 5/1988
EP 0398698 A2 11/1990

(Continued)

OTHER PUBLICATIONS

Periodic System of the Elements, Handbook of Chemistry & Physics, 1989-1990, 70th Edition, CRC Press.

(Continued)

*Primary Examiner* — Alexa Neckel
*Assistant Examiner* — Elizabeth Eng
(74) *Attorney, Agent, or Firm* — Cantor Colburn LLP

(57) ABSTRACT

The invention relates to a process for preparing a polymerization catalyst component wherein a solid compound with formula $Mg(OR^1)_xCl_{2-x}$ wherein x is larger than 0 and smaller than 2, and each $R^1$, independently, represents an alkyl group, said compound being obtained by reacting a Grignard compound with an alkoxy- or aryloxy-containing silane compound, is contacted with at least one activating compound selected from the group formed by internal electron donors and compounds of formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M and w is smaller than v, in the presence of an inert dispersant to give an intermediate reaction product, and wherein the intermediate reaction product is contacted with a halogen-containing Ti-compound. A catalyst system comprising said component shows improved performance in olefin polymerization.

The invention also relates to a polymerization catalyst system comprising the catalyst component and to a process of making a polyolefin by contacting at least one olefin with a polymerization catalyst system comprising the catalyst component.

13 Claims, No Drawings

(56) References Cited

U.S. PATENT DOCUMENTS

2003/0008983 A1* 1/2003 Zakharov et al. ......... 526/123.1
2008/0312389 A1* 12/2008 Ramjoie et al. ................ 526/97

FOREIGN PATENT DOCUMENTS

| EP | 0921135 A1 | | 6/1999 |
|---|---|---|---|
| EP | 383808 A1 | | 1/2004 |
| EP | 1661917 | * | 11/2004 |
| GB | 2112402 A | | 7/1983 |
| WO | WO89/02446 | | 3/1989 |
| WO | 9632427 A1 | | 10/1996 |
| WO | WO96/32426 | | 10/1996 |
| WO | WO 01/23441 A1 | | 4/2001 |
| WO | PCT/EP05/012202 | | 11/2005 |
| WO | WO2006/056338 A1 | | 6/2006 |

OTHER PUBLICATIONS

Ser Van Der Ven; Polypropylene and Other Polyolefins, 1990, p. 8-10; Elsevier, NL.

International Search Report; International Application No. PCT/EP2007/004572; International Filing Date: May 23, 2007; Date of Mailing: May 23, 2007; 6 pages.

Written Opinion of the Searching Authority; International Application No. PCT/EP2007/004572; International Filing Date: May 23, 2007; Date of Mailing: Oct. 25, 2007; 5 Pages.

* cited by examiner

PROCESS FOR PREPARING A CATALYST COMPONENT FOR PROPYLENE POLYMERIZATION

The invention is directed to a process for preparing a polymerization catalyst component. The invention also relates to a polymerization catalyst system comprising the catalyst component and to a process of making a polyolefin by contacting at least one olefin with a polymerization catalyst system comprising the catalyst component.

Catalyst systems and their components that are suitable for preparing a polyolefin such as for example polypropylene are generally known, and the essential elements for the preparation of such catalyst components include a solid magnesium-containing compound and a titanium compound supported thereon. Such catalysts are generally referred to as Ziegler-Natta catalysts. The preparation of such a catalyst component is for instance described in WO96/32427 A1, which publication discloses a 3-step process wherein, in the first two steps a Mg-containing support of certain morphology is prepared, and subsequently the Mg-containing support is contacted with titanium tetrachloride, and optionally an electron-donating compound. An advantage of this catalyst component is that a catalyst system made therewith shows high activity in olefin, especially propylene, polymerization.

There is, however, an on-going need in industry for catalysts showing better performance, especially higher activity.

It is an object of the invention to provide a process for preparing a polymerization catalyst component, and to provide a polymerization catalyst system comprising this catalyst component that shows enhanced activity in polymerizing an olefin, especially propylene, while maintaining other required characteristics for the polyolefin obtained such as for example a high bulk density and a narrow particle size distribution.

This object is achieved with a process for preparing a polymerization catalyst component comprising the steps of
i) contacting a compound $R^4_zMgX_{2-z}$ wherein $R^4$ is an organic group, X is a halide, and z is larger than 0 and smaller than 2, with an alkoxy- or aryloxy-containing silane compound to give a solid magnesium-containing compound of formula $Mg(OR^1)_xCl_{2-x}$ wherein x is larger than 0 and smaller than 2, and each $R^1$, independently, represents an alkyl group;
ii) contacting the solid $Mg(OR^1)_xCl_{2-x}$ with at least one activating compound selected from the group formed by internal electron donors and compounds of formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M and w is smaller than v, in the presence of an inert dispersant to give an intermediate reaction product, and
iii) contacting the intermediate reaction product with a halogen-containing Ti-compound, optionally in the presence of an internal donor.

It is true that in the co-pending application WO 2006/056338 A1 a similar process is disclosed, but this disclosure is limited to a process wherein a compound of formula $Mg(OR)_yCl_{2-y}$ with y larger than 0 and smaller than 2, and each R, independently, represents an alkyl group, is contacted with a titanium tetra-alkoxide and/or an alcohol in the presence of an inert dispersant.

It is an advantage of the process according to the present invention that a catalyst system with a higher activity is obtained if before being contacted with the halogen-containing titanium compound, the solid magnesium-containing compound is treated with at least one of the defined activating compounds in the presence of an inert dispersant; that is a higher yield of polyolefin is obtained per gram of catalyst system. The higher activity results in lower amounts of catalyst residues present in the polymer made, and in reduced catalyst costs in the polyolefin production. A further advantage is that the ethylene sensitivity of a catalyst system comprising said component, for example in copolymerization of propylene and ethylene, can be influenced by varying the activating compound.

Identifying processes to make catalyst components that show advantageous performance in a Ziegler-Natta type of catalyst system for olefin polymerization is the subject of many publications. For example, in EP 0268274 A2 and EP 0398698 A2 a catalyst comprising a catalyst component obtained by reacting magnesium alkoxide titanium tetra-alkoxide and a silicon compound is disclosed.

U.S. Pat. No. 5,229,342 discloses a process including a step of making a solution of a specific magnesium complex by reaction of magnesium metal, titanium tetraethoxide, triethylborate, ferric chloride and ethanol.

In U.S. Pat. No. 4,771,023 an organo magnesium compound is reacted with a titanium haloalkoxide in the presence of an organo silicon compound to give a solid catalyst component.

GB 2112402 A discloses a catalyst comprising a solid catalyst component that was obtained by reacting an alkyl magnesium halide or an alkoxy magnesium halide with at least a metal alkoxide, a silane compound, and a halogen-containing Ti-compound; but in a different sequence of steps than in the present invention.

In WO 89/02446 A1 a solid catalyst component is made by reacting a silica support first with a soluble magnesium chloroalkoxide compound, and then with a titanium compound.

EP 0921135 A1 discloses to contact a solid catalyst component, which can be prepared from a magnesium, a titanium and an electron donating compound in various ways differing from the present invention, with an alcohol.

In EP 1383808 B1 also a polymerization catalyst system is prepared from a magnesium chloroalkoxide, but by directly reacting it with titanium tetrachloride in an aromatic hydrocarbon solvent in multiple steps.

None of these publications discloses or suggests an intermediate step of reacting a solid magnesium chloroalkoxide, obtained from a Grignard compound and a silane compound, with the presently claimed activating compounds. In WO96/32427 A1 it is even indicated that no intermediate activation step would be needed, if a catalyst component is made from a solid magnesium-containing support of formula $Mg(OR)_yCl_{2-y}$.

In step i) of the process according to the invention a solid magnesium-containing support is prepared by contacting a compound or a mixture of compounds of formula $R^4_zMgX_{2-z}$ wherein $R^4$ is an organic group, X is a halide, and z is larger than 0 and smaller than 2, with an alkoxy- or aryloxy-containing silane compound, as for example described in WO 96/32427 A1 and WO 01/23441 A1.

In the compound $R^4_zMgX_{2-z}$, also referred to as Grignard compound, X is preferably chlorine or bromine, more preferably chlorine.

The organic group $R^4$ can be an aliphatic or aromatic group, preferably containing from 1 up to 20 carbon atoms. $R^4$ can be an alkyl, aryl, aralkyl, alkoxide, phenoxide, etc., or mixtures thereof. Suitable examples of group $R^4$ are methyl, ethyl, n-propyl, i-propyl, n-butyl, i-butyl, t-butyl, hexyl, cyclohexyl, octyl, phenyl, tolyl, xylyl, mesityl and benzyl. In a preferred embodiment of the invention, $R^4$ represents an aromatic group, for instance a phenyl group.

The Grignard compound of formula $R^4{}_zMgX_{2-z}$, wherein z is larger than 0 and smaller than 2, is preferably characterized by z being from about 0.5 to 1.5.

The alkoxy- or aryloxy-containing silane used in step i) is preferably a compound or a mixture of compounds with the general formula $Si(OR^5)_{4-n}R^6{}_n$, wherein n can range from 0 up to 4, preferably n is from 0 up to and including 1, and wherein each $R^5$ and $R^6$ groups, independently, represent an alkyl, alkenyl or aryl group, optionally containing one or more hetero atoms for instance O, N, S or P, with, for instance, 1-20 C-atoms, as defined below for $R^2$ and $R^3$.

Examples of suitable silane-compounds include tetramethoxysilane, tetraethoxysilane, methyltrimethoxysilane, methyltributoxysilane, ethyltriethoxysilane, phenyltriethoxysilane, diethyldiphenoxysilane, n-propyltriethoxysilane, diisopropyldimethoxysilane, diisobutyldimethoxysilane, n-propyltrimethoxysilane, cyclohexylmethyldimethoxysilane, dicyclopentyldimethoxysilane, isobutylisopropyldimethoxylsilane, phenyltrimethoxysilane, diphenyldimethoxysilane, trifluoropropylmethyldimethoxysilane, bis(perhydroisoquinolino)dimethoxysilane, dicyclohexyldimethoxysilane, dinorbornyldimethoxysilane, di(n-propyl)dimethoxysilane, di(iso-propyl)dimethoxysilane, di(n-butyl)dimethoxysilane and/or di(iso-butyl)dimethoxysilane. Preferably, tetraethoxysilane is used as silane-compound in preparing the solid Mg-containing compound in the process according to the invention.

Preferably, in step i) the silane-compound and the Grignard compound are introduced simultaneously to a mixing device to result in particles of advantageous morphology, especially of the larger particles, as described in WO 01/23441 A1. Here, 'morphology' does not only refer to the shape of the particles of the solid Mg-compound and the catalyst made therefrom, but also to the particle size distribution (also characterized as span), its fines content, powder flowability, and the bulk density of the catalyst particles. Moreover, it is well known that a polyolefin powder produced in polymerization process using a catalyst system based on such catalyst component has a similar morphology as the catalyst component (the so-called "replica effect"; see for instance S. van der Ven, Polypropylene and other Polyolefins, Elsevier 1990, p. 8-10). Accordingly, almost round polymer particles are obtained with a length/diameter ratio (l/D) smaller than 2 and with good powder flowability.

Introduced simultaneously means that the introduction of the first reaction product and the silane-compound is done in such way that the molar ratio Mg/Si does not substantially vary during the introduction of these compounds to the mixing device, as described in WO 01/23441 A1.

The silane-compound and Grignard compound can be continuously or batch-wise introduced to the mixing device. Preferably, the both compounds are introduced continuously to a mixing device.

The mixing device can have various forms; it can be a mixing device in which the silane-compound is premixed with the Grignard compound, the mixing device can also be a stirred reactor, in which the reaction between the compounds takes place.

Preferably, the compounds are premixed before the mixture is introduced to the reactor for step i). In this way a catalyst component is formed with a morphology that leads to polymer particles with the best morphology (high bulk density, narrow particle size distribution, (virtually) no fines, excellent flowability).

The Si/Mg molar ratio during step i) may vary within wide limits for instance from 0.2 to 20. Preferably, the Si/Mg molar ratio is from 0.4 to 1.0.

The period of premixing in above indicated reaction step may vary between wide limits, for instance 0.1 to 300 seconds. Preferably premixing is performed during 1 to 50 seconds.

The temperature during the premixing step is not specifically critical, and may for instance range between 0 and 80° C.; preferably the temperature is between 10° C. and 50° C.

The reaction between said compounds may, for instance, take place at a temperature between −20° C. and 100° C.; preferably at a temperature of from 0° C. to 80° C.

The solid product obtained from the reaction between the silane-compound and the Grignard compound, is usually purified by rinsing with an inert solvent, for instance a hydrocarbon solvent with for example 1-20 C-atoms, like pentane, iso-pentane, hexane or heptane. The solid product can be stored and further used as a suspension in said inert solvent. Alternatively, the product may be dried, preferably partly dried, and preferably under mild conditions; e.g. at ambient temperature and pressure.

In the solid magnesium-containing compound of formula $Mg(OR^1)_xCl_{2-x}$, the group $R^1$ generally is an alkyl containing 1-12 carbon atoms. The alkyl group may be linear or branched.

Preferably, the $R^1$ group contains 1-8 carbon atoms. More preferably, at least one of the $R^1$-groups represents an ethyl group. In a preferred embodiment, each $R^1$-group represents an ethyl group.

The solid magnesium-containing compound is reacted in step ii) with at least one activating compound selected from the group formed by internal electron donors and compounds of formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M and w is smaller than v.

An internal donor (also referred to as internal electron donor) is within the present application defined as an electron-donating compound that is commonly described as a reactant in the preparation of a solid catalyst component for a (Ziegler-Natta) catalyst system for olefin polymerization; i.e. contacting a magnesium-containing support with a halogen-containing Ti compound and an internal donor. Examples of suitable internal electron donors are known to the skilled person, and include carboxylic acids, carboxylic acid anhydrides, carboxylic acid esters, carboxylic acid halides, alcohols, ethers, ketones, amines, amides, nitriles, aldehydes, alkoxides, sulphonamides, thioethers, thioesters and other organic compounds containing one or more hetero atoms, such as nitrogen, oxygen, sulphur and/or phosphorus.

Suitable carboxylic acids may be aliphatic or (partly) aromatic, Examples include formic acid, acetic acid, propionic acid, butyric acid, isobutanoic acid, acrylic acid, methacrylic acid, maleic acid, fumaric acid, tartaric acid, cyclohexanoic monocarboxylic acid, cis-1,2-cyclohexanoic dicarboxylic acid, phenylcarboxylic acid, toluenecarboxylic acid, naphthalene carboxylic acid, phthalic acid, isophthalic acid, terephthalic acid and/or trimellitic acid.

Anhydrides of the aforementioned carboxylic acids can be mentioned as examples of carboxylic acid anhydrides, such as for example acetic acid anhydride, butyric acid anhydride and methacrylic acid anhydride.

Suitable examples of esters of above-mentioned carboxylic acids are formates, for instance, butyl formate; acetates, for instance ethyl acetate and butyl acetate; acrylates, for instance ethyl acrylate, methyl methacrylate and isobutyl methacrylate; benzoates, for instance methylbenzoate and ethylbenzoate; methyl-p-toluate; ethyl-naphthate and phthalates, for instance monomethyl phthalate, dibutyl phthalate, diisobutyl phthalate, diallyl phthalate and/or diphenyl phthalate.

Examples of suitable carboxylic acid halides are the halides of the carboxylic acids mentioned above, for instance acetyl chloride, acetyl bromide, propionyl chloride, butanoyl chloride, butanoyl iodide, benzoyl bromide, p-toluoyl chloride and/or phthaloyl dichloride.

Suitable alcohols are linear or branched aliphatic alcohols with 1-12 C-atoms, or aromatic alcohols. Examples include methanol, ethanol, butanol, isobutanol, hexanol, xylenol and benzyl alcohol. The alcohols may be used alone or in combination.

In a preferred embodiment of the invention the alcohol is ethanol or hexanol.

Examples of suitable ethers are diethyl ether, dibutyl ether, diisoamyl ether, anisole and ethylphenyl ether, 2,2-diisobutyl-1,3-dimethoxypropane, 2,2-dicyclopentyl-1,3-dimethoxypropane, 2-ethyl-2-butyl-1,3-dimethoxypropane, 2-isopropyl-2-isopentyl-1,3-dimethoxypropane and/or 9,9-bis(methoxymethyl) fluorene. Also, cyclic ethers like tetrahydrofuran (THF), or tri-ethers can be used.

Suitable examples of other organic compounds containing a heteroatom include 2,2,6,6-tetramethyl piperidine, 2,6-dimethylpiperidine, pyridine, 2-methylpyridine, 4-methylpyridine, imidazole, benzonitrile, aniline, diethylamine, dibutylamine, dimethylacetamide, thiophenol, 2-methyl thiophene, isopropyl mercaptan, diethylthioether, diphenylthioether, tetrahydrofuran, dioxane, dimethylether, diethylether, anisole, acetone, triphenylphosphine, triphenylphosphite, diethylphosphate and/or diphenylphosphate.

The at least one activating compound can also be of formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M, being either 3 or 4, and w is smaller than v. The $R^2$ and $R^3$ groups can be a linear, branched or cyclic alkyl or alkenyl group, suitable groups contain from 1 to 20 carbon atoms, preferably 1-12 or 1-8 carbon atoms. The groups may differ independently, or be the same. In preferred embodiments $R^2$ and $R^3$ are ethyl, propyl or butyl; more preferably all groups are ethyl groups. $R^2$ and $R^3$ can also be aromatic hydrocarbon groups, optionally substituted with e.g. alkyl groups, and can contain for example from 6 to 20 carbon atoms.

The $R^2$ and $R^3$ groups may optionally contain one or more hetero atoms, such as for instance O, N, S or P.

Preferably, M in said activating compound is Ti or Si.

In a preferred embodiment of the invention the value of w is 0, the activating compound being for example a titanium tetraalkoxide containing 4-32 C-atoms. The four alkoxide groups in the compound may be the same or may differ independently. Preferably, at least one of the alkoxy groups in the compound is an ethoxy group. More preferably the compound is a tetraalkoxide, like titanium tetraethoxide.

Si-containing compounds suitable as activating compounds are the same as listed above for step i).

In the process according to the invention one activating compound can be used, but also a mixture of two or more compounds may be used.

A combination of a compound of formula $M(OR^2)_{v-w}(R^3)_w$, as defined above, with an internal electron donor is preferred as activating compound, to obtain a catalyst system that for example shows high activity, and of which the ethylene sensitivity can be affected by selecting the internal donor; which is specifically advantageous in preparing copolymers of for example propylene and ethylene.

Preferably, a Ti-based compound, for example titanium tetraethoxide, is used together with an alcohol, like ethanol or hexanol, or with an ester compound, like ethylacetate, ethylbenzoate or a phthalate ester, or together with an ether, like dibutylether, or with pyridine.

If two or more activating compounds are used in the process according to the invention, their order of addition is not critical, but may affect catalyst performance depending on the compounds used. A skilled person may optimise their addition based on some experiments. The compounds can be added together, or sequentially. For example, a carboxylic acid ester may be added before, during or after the treatment with a titanium tetraalkoxyde, or a combination thereof can be applied.

In a preferred embodiment of the invention an internal donor compound is first added to the compound with formula $Mg(OR^1)_xCl_{2-x}$ whereafter a compound of formula $M(OR^2)_{v-w}(R^3)_w$ is added. The activating compounds preferably are added slowly, for instance during a period of 0.1-6, preferably during 0.5-4 hours, most preferably during 1-2.5 hours, each.

In the process according to the invention the inert dispersant is preferably a hydrocarbon solvent. The dispersant may be for example an aliphatic or aromatic hydrocarbon with 1-20 C-atoms.

Preferably, the dispersant is an aliphatic hydrocarbon, more preferably pentane, iso-pentane, hexane or heptane, heptane being most preferred.

In the process according to the invention the molar ratio of activating compound to $Mg(OR^1)_xCl_{2-x}$ may range between wide limits and is, for instance, between 0.02 and 1.0. Preferably the molar ratio is between 0.05 and 0.5, more preferably between 0.06 and 0.4, or even between 0.07 and 0.2.

In the process according to the invention the temperature in step ii) can be in the range from $-20°$ C. to $70°$ C., preferably from $-10°$ C. to $50°$ C., more preferably in the range from $-5°$ C. to $40°$ C., and most preferably in the range between $0°$ C. and $30°$ C.

Preferably, at least one of the reaction components is dosed in time, for instance during 0.1 to 6, preferably during 0.5 to 4 hours, more particularly during 1-2.5 hours.

The obtained solid intermediate product can be further washed, preferably with the solvent also used as inert dispersant; and then stored and further used as a suspension in said inert solvent. Alternatively, the product may be dried, preferably partly dried, preferably slowly and under mild conditions; e.g. at ambient temperature and pressure.

Starting from a solid Mg-containing product of controlled morphology, said morphology is not negatively affected during treatment with the activating compound. The solid intermediate product obtained is considered to be an adduct of the Mg-containing compound and the at least one activating compound, and is still of controlled morphology. This intermediate reaction product is subsequently contacted with a halogen-containing titanium compound in step iii), preferably in the presence of an internal electron donor compound in one or more steps.

According to a preferred embodiment, the process according to the invention is characterized in that a solid compound with formula $Mg(OR^1)_xCl_{2-x}$ wherein x is larger than 0 and smaller than 2, and each $R^1$, independently, represents an alkyl group with 1-8 carbon atoms, is contacted with a carboxylic acid ester and a titanium tetraalkoxide in the presence of an inert dispersant to give a solid intermediate reaction product, which intermediate reaction product is then contacted with titanium tetrachloride in the presence of an internal donor.

In the process according to the invention, the Ti/Mg molar ratio in the contact between the intermediate product and halogen-containing titanium compound preferably is between 10 and 100, most preferably, between 10 and 50.

In the process according to the invention, the intermediate reaction product is preferably contacted with a halogen-containing Ti-compound in the presence of an internal donor. Suitable compounds that can be used as internal electron donor are known to the skilled person, and have been defined above.

The molar ratio of the internal electron donor relative to the magnesium during the treatment of the intermediate product with the titanium tetrachloride may vary between wide limits, for instance between 0.05 and 0.75.

Preferably this molar ratio is between 0.1 and 0.4.

Preferably, dibutyl phthalate is used as the internal electron donor, more preferably di-n-butyl phthalate.

During contacting the intermediate product and the halogen-containing titanium compound, an inert dispersant is preferably used. The dispersant preferably is chosen such that virtually all side products formed are dissolved in the dispersant. Suitable dispersants include for example aliphatic and aromatic hydrocarbons and halogenated aromatic solvents with for instance 4-20 C-atoms. Examples include toluene, xylene, benzene, heptane, o-chlorotoluene and chlorobenzene.

The reaction temperature during contacting in step iii) the intermediate product and the halogen-containing titanium compound is preferably between 0° C. and 150° C., more preferably between 50° C. and 150° C., and most preferably between 60° C. and 120° C. At higher or lower temperatures the activity of a catalyst system prepared from the catalyst component prepared according to the process of the invention becomes lower. The obtained reaction product is purified, usually with an inert aliphatic or aromatic hydrocarbon or halogenated aromatic compound, to obtain the catalyst component of the invention. If desired the reaction and subsequent purification steps may be repeated one or more times. A final washing is preferably performed with an aliphatic hydrocarbon to result in a suspended or at least partly dried catalyst component, as described above for the other steps.

The invention further relates to a polymerization catalyst component obtained with the process according to the invention, and to a polymerization catalyst system comprising the catalyst component.

The polymerization catalyst system comprises a catalyst component according to the invention and a co-catalyst. Preferably, the catalyst system also comprises an external electron-donating compound, also referred to as external electron donor, or simply external donor. The main function of this external donor compound is to affect the stereoselectivity of the catalyst system in polymerization of olefins having 3 or more carbon atoms, and is for this reason also called selectivity control agent.

The invention further relates to a process of making a polyolefin by contacting at least one olefin with a polymerization catalyst system comprising the catalyst component obtained with the process according to the invention.

The preparation of polyolefins takes place by polymerising one or more olefins simultaneously and/or successively in the presence of a catalyst system comprising the catalyst component according to the invention, a co-catalyst and optionally an external donor.

It is an advantage of the present invention that the polymer obtained contains a low amount of catalyst residues, and has favourable bulk density and particle size distribution.

The olefins that can be polymerized in the process according to the invention may be mono- and di-olefins containing from 2 to 10 carbon atoms, such as for example ethylene, propylene, butylene, hexene, octane and/or butadiene.

According to a preferred embodiment of the invention the olefin is propylene or a mixture of propylene and ethylene, to result in a propylene homopolymer or copolymer. A propylene copolymer is herein meant to include both so-called random copolymers with relatively low comonomer content, e.g. up to 10 mol %, as well as so-called impact copolymers comprising higher comonomer contents, e.g. from 5 to 80 mol %, more typically from 10 to 60 mol %.

In fact, such impact copolymers are actually blends of different propylene polymers, like a first component of low comonomer content and high crystallinity, and a second component of high comonomer content having low crystallinity or even rubbery properties.

Generally, the co-catalyst is an organometallic compound containing a metal from group 1, 2, 12 or 13 of the Periodic System of the Elements (Handbook of Chemistry and Physics, 70th Edition, CRC Press, 1989-1990).

Preferably, the co-catalyst is an organoaluminium compound. The organoaluminium compound may be, for instance, a compound having the formula $AlR^7_3$, wherein each $R^7$ independently represents an alkyl group with, for instance, 1-10 C-atoms or an aryl group with, for instance, 6-20 C-atoms. Examples of a suitable organoaluminium compound are trimethyl aluminium, triethyl aluminium, triisobutyl aluminium, and/or trioctyl aluminium. Preferably, the co-catalyst is triethyl aluminium.

Examples of suitable external donors include the compounds described above as internal donors that can be used in the preparation of the catalyst component. As external donor also organo-silicon compounds can be used. Mixtures of external donors can also be used.

Examples of organo-silicon compounds that are suitable as external donor are compounds or mixtures of compounds of general formula $Si(OR^8)_{4-n}R^9_n$, wherein n can be from 0 up to 4, preferably n is 1 or 2, and each $R^8$ and $R^9$, independently, represents an alkyl or aryl group, optionally containing one or more hetero atoms for instance O, N, S or P, with, for instance, 1-20 C-atoms, as defined above for $R^2$ and $R^3$. Examples of suitable compounds include the silane-compounds that can be used as activating compound, as described above.

Preferably the organo-silicon compound used as external donor is n-propyl trimethoxysilane, cyclohexyl methyldimethoxysilane, dicyclopentyl dimethoxysilane, di(iso-propyl) dimethoxysilane or di(iso-butyl) dimethoxysilane.

The molar ratio of the metal of the co-catalyst relative to titanium in the polymerization catalyst system during the polymerization may vary for instance from 5 to 2000. Preferably this ratio is between 50 and 300.

The aluminium/external donor molar ratio in the polymerization catalyst system preferably is between 0.1 and 200; more preferably between 1 and 100.

The polymerization process can be carried out in the gas phase or in the liquid phase (in bulk or slurry). In the case of polymerization in a slurry (liquid phase) a dispersing agent is present. Suitable dispersing agents include for example n-butane, isobutane, n-pentane, isopentane, hexane, heptane, octane, cyclohexane, benzene, toluene, xylene and liquid propylene.

The polymerization conditions of the process according to the invention, such as for example the polymerization temperature and time, monomer pressure, avoidance of contamination of catalyst, choice of polymerization medium in slurry processes, the use of further ingredients (like hydrogen) to control polymer molar mass, and other conditions are well known to persons of skill in the art.

The polymerization temperature may vary within wide limits and is, for example for propylene polymerization, between 0° C. and 120° C., preferably between 40° C. and 100° C.

The pressure during (propylene) (co)polymerization is for instance between 0.1 and 6 MPa, preferably between 0.5-3 MPa.

The molar mass of the polyolefine obtained during the polymerization can be controlled by adding during the polymerization hydrogen or any other agent known to be suitable for the purpose.

The polymerization can be carried out in a continuous mode or batch-wise. Slurry-, bulk-, and gas-phase polymerization processes, multistage processes of each of these types of polymerization processes, or combinations of the different types of polymerization processes in a multistage process are contemplated herein.

Preferably the polymerization process is a single stage gas phase process or a multistage, for instance a 2-stage, gas phase process wherein in each stage a gas-phase process is used.

Examples of gas-phase polymerization processes include both stirred bed reactors and fluidized bed reactor systems; such processes are well known in the art. Typical gas phase α-olefin polymerization reactor systems comprise a reactor vessel to which α-olefin monomer(s) and a catalyst system can be added and which contain an agitated bed of growing polymer particles.

The invention will be further elucidated with the following experiments without being limited hereto.

EXPERIMENTS I-XXVI

Slurry Polymerization of Propylene

Example I

I.A. Grignard Formation Step

A flask, fitted with a reflux condenser and a funnel, was filled with magnesium powder (24.3 g, 1 mol). The flask was brought under nitrogen. The magnesium was heated at 80° C. for 1 hour, after which a mixture of dibutyl ether (170 ml) and chlorobenzene (60 ml) was added. Then iodine (0.03 g) and n-chlorobutane (3 ml) were successively added to the reaction mixture. After the colour of the iodine had disappeared, the temperature was raised to 97° C. and chlorobenzene (220 ml) was slowly added for 2.5 hours. The dark reaction mixture that was formed in the process was stirred for another 8 hours at 97° C. Then the stirring and heating were stopped and the solid material was allowed to settle for 48 hours. By decanting the solution above the precipitate, a solution of phenylmagnesiumchloride reaction product I.A with a concentration of 1.36 mol Mg/l was obtained. This solution was used in the further catalyst preparation.

I.B. Preparation of a Compound with Formula $Mg(OR^1)_xCl_{2-x}$

The solution of reaction product of step I (200 ml, 0.272 mol Mg) and 100 ml of a solution of tetraethoxysilane (TES) in dibutyl ether (DBE), (33.4 ml of TES and 66.6 ml of DBE), were cooled to 15° C., and then were dosed simultaneously to a mixing device of 0.45 ml volume supplied with a stirrer and jacket. Thereafter the premixed reaction product I.A and the TES-solution were introduced to a reactor. The mixing device (minimixer) was cooled to 10° C. by means of cold water circulating in the minimixer's jacket. The reagents contact time was 13 s in the minimixer and the connecting tube between the minimixer and the reactor. The stirring speed in the minimixer was 1000 rpm. The mixture formed in the minimixer was introduced to a 0.7 l reactor, with stirring. The reactor was loaded with 100 ml of DBE, and cooled to 5° C. Dosing time was 1 hour. The stirring speed in the reactor was 200 rpm.

On the dosing completion the reaction mixture was kept at 5° C. for 0.5 hour, then heated up to 60° C. and kept at this temperature for 1 hour. Then the stirring was stopped and the solid substance was allowed to settle. The supernatant was removed by decanting. The solid substance was washed three times using 300 ml of heptane. As a result, a pale yellow solid substance, reaction product I.B, was obtained, suspended in 110 ml of heptane.

I.C. Activation of Mg-Containing Support

In an inert nitrogen atmosphere at 0° C. a 250 ml glass flask equipped with a mechanical agitator was filled with a slurry of 5 g of reaction product I.B dispersed in 60 ml of heptane. Subsequently a solution of 1.57 ml titanium tetraethoxide (TET) in 20 ml of heptane was added at 25° C. for 1 hour. The ratio TET/Mg=0.2

The slurry was slowly allowed to warm up to 30° C. for 90 min and kept at that temperature for another 2 hours. Finally the supernatant liquid was decanted from the solid substance (about 5.5 g), which was washed once with 90 ml of heptane at 30° C. As a result, reaction product I.C was obtained, suspended in 15 ml of heptane.

I.D. Preparation of the Catalyst Component

A reactor was brought under nitrogen and 125 ml of titanium tetrachloride was added to it. The reactor was heated to 115° C. and a suspension, containing about 5.5 g of reaction product I.C in 15 ml of heptane, was added to it under stirring. Then the reaction mixture was kept at 115° C. for 15 min and 2.4 ml of dibutyl phthalate was added to reactor. Then the reaction mixture was kept at 115° C. for 105 min. Then the stirring was stopped and the solid substance was allowed to settle. The supernatant was removed by decanting, after which the solid product was washed with chlorobenzene (125 ml) at 100° C. for 20 min. Then the washing solution was removed by decanting, after which a mixture of titanium tetrachloride (62.5 ml) and chlorobenzene (62.5 ml) was added. The reaction mixture was kept at 115° C. for 30 min, after which the solid substance was allowed to settle, and the last treatment was repeated once again. The solid substance obtained was washed five times using 150 ml of heptane at 60° C., after which the catalyst component, suspended in heptane, was obtained.

I.E. Polymerization of Propylene

Polymerization of propylene was carried out in a stainless steel reactor (with a volume of 0.7 l) in heptane (300 ml) at a temperature of 70° C., total pressure 0.7 MPa and hydrogen presence (55 ml) for 1 hour in the presence of a catalyst system comprising the catalyst component according to step I.D, triethylaluminium and propyltrimethoxysilane. The concentration of the catalyst component was 0.033 g/l; the concentration of triethylaluminium was 4.0 mmol/l and the concentration of propyltrimethoxysilane was 0.4 mmol/l.

Data on the catalyst performance during the propylene polymerization are presented in Table 1. The particles of the polymer powder obtained had a round shape.

Examples II-III

Example I was repeated, except that 0.79 ml of titaniumtetraethoxide (Ti/Mg=0.1), and 0.39 ml of titaniumtetraethoxide (Ti/Mg=0.05) was used in step I.C. respectively.

The results are presented in Table 1.

Example IV

Example I was repeated, except for the fact that step I.C was performed as follows: in an inert nitrogen atmosphere at 0° C. a 250 ml glass flask equipped with a mechanical agitator is filled with a slurry of 5 g of reaction product I.B dispersed in 60 ml of heptane. Subsequently a solution of 0.33 ml ethanol (EtOH/Mg=0.15) in 20 ml heptane is dosed under stirring during 1 hour. After keeping the reaction mixture at 0° C. for 30 minutes, a solution of 1.18 ml titanium tetraethoxide (TET/Mg=0.15) in 20 ml of heptane was added at 0° C. for 1 hour. The slurry was slowly allowed to warm up to 30° C. for 90 min and kept at that temperature for another 2 hours. Finally the supernatant liquid was decanted from the solid reaction product (~5.5 g) which was washed once with 90 ml of heptane at 30° C.

The results are presented in Table 1.

Example V-VII

Example IV was repeated, except that 0.28 ml of ethanol (EtOH/Mg=0.125) and 0.79 ml of titanium tetraethoxide (Ti/Mg=0.1); 0.22 ml of ethanol (EtOH/Mg=0.1) and 0.99 ml of titanium tetraethoxide (Ti/Mg=0.125); and 0.22 ml of ethanol (EtOH/Mg=0.1) and 0.79 ml of titanium tetraethoxide (Ti/Mg=0.1) were used in step I.C., respectively.

The results are presented in Table 1.

Example VIII

Example IV was repeated, except that step I.C was performed as follows: in an inert nitrogen atmosphere at 20° C. a 250 ml glass flask equipped with a mechanical agitator is filled with a slurry of 5 g of reaction product I.B. dispersed in 60 ml of heptane. Subsequently a solution of 0.22 ml ethanol (EtOH/Mg=0.1) in 20 ml heptane is dosed under stirring during 1 hour. After keeping the reaction mixture at 20° C. for 30 minutes, a solution of 0.79 ml titanium tetraethoxide (TET/Mg=0.1) in 20 ml of heptane was added for 1 hour. The slurry was slowly allowed to warm up to 30° C. for 90 min and kept at that temperature for another 2 hours. Finally the supernatant liquid is decanted from the solid reaction product which was washed once with 90 ml of heptane at 30° C.

The results are presented in Table 1.

Example IX

Example IV was repeated, except that in step I.C was done as follows: in inert nitrogen atmosphere at 0° C. a 250 ml glass flask equipped with a mechanical agitator is filled with a slurry of 5 g of reaction product I.B dispersed in 60 ml of heptane. Subsequently a solution of 0.22 ml ethanol (EtOH/Mg=0.1) and 0.99 ml titaniumtetraethoxide (TET/Mg=0.125) in 20 ml heptane is dosed under stirring during 1 hour. The slurry was slowly allowed to warm up to 30° C. for 90 min and kept at that temperature for another 2 hours. Finally the supernatant liquid is decanted from the from the solid reaction product (~5.5 g) which was washed once with 90 ml of heptane at 30° C.

The results are presented in Table 1.

Example X

Example VII was repeated, except that step I.D was performed as described below.

A reactor was brought under nitrogen and titanium tetrachloride (87.5 ml) was added to it. The reactor was heated to 115° C. and a suspension, containing 5 g of reaction product I.C in 15 ml of heptane, was added to it under stirring. Then the reaction mixture was kept at 115° C. for 15 min and 2 ml of dibutyl phthalate was added to reactor. Then the reaction mixture was kept at 115° C. for 105 min., and stirring was stopped and the solid substance was allowed to settle. The supernatant was removed by decanting, after which the solid product was washed with chlorobenzene (87.5 ml) at 100° C. for 20 min. Then the washing solution was removed by decanting, after which a mixture of titanium tetrachloride (44 ml) and chlorobenzene (44 ml) was added. The reaction mixture was kept at 115° C. for 30 min, after which the solid substance was allowed to settle, and the last treatment was repeated once again. The solid substance obtained was washed five times using 150 ml of heptane at 60° C., after which the catalyst component, suspended in heptane, was obtained.

The results are presented in Table 1.

Example XI

Example VII was repeated, except that step I.D was performed as described below.

A reactor was brought under nitrogen and a mixture of titanium tetrachloride (50 ml) and toluene (50 ml) was added to it. Then a suspension, containing 5 g of reaction product I.C. in 15 ml of heptane, was added to it under stirring at 25° C. The reactor was heated to 115° C., the reaction mixture was kept at 115° C. for 15 min and 1.65 ml of dibutyl phthalate was added to reactor. Then the reaction mixture was kept at 115° C. for 1 hour. Then the stirring was stopped and the solid substance was allowed to settle. The supernatant was removed by decanting, after which the solid product was washed with toluene (100 ml) at 100° C. for 20 min. Then the washing solution was removed by decanting, after which a mixture of titanium tetrachloride (50 ml) and toluene (50 ml) was added. The reaction mixture was kept at 115° C. for 30 min, after which the solid substance was allowed to settle, and the last treatment was repeated once again. The solid substance obtained was washed five times using 150 ml of heptane at 60° C., after which the catalyst component, suspended in heptane, was obtained.

The results are presented in Table 1.

Example XII

Example XI was repeated, but chlorobenzene was used instead of toluene when step I.D was performed.
The results are presented in Table 1.

Comparative Experiment A

Example I was repeated, however without activation step I.C.
The results are presented in Table 1.

Example XIII

XIII.A. Grignard Formation Step

Magnesium (97.2 g, 4 mol) was dried under vacuum at 90° C. for 2 hours and brought in a flask with a funnel and a stirrer under nitrogen. Then a mixture of 280 ml dibutylether and 70 ml chlorobenzene was added and the temperature was raised to 80° C. Then a mixture of 0.2 g iodine and 12 ml n-chlorobutane was added to the reaction mixture. After the colour of the iodine had disappeared, the temperature was raised to 97° C. and a mixture of 200 ml dibutylether and 180 ml chlorobenzene was added for 25 minutes, followed by the addition of 800 ml chlorobenzene and 200 ml dibutylether in about 2.5 hours. The dark reaction mixture that was formed in the process was stirred for another 4 hours at 102±2° C. Then the stirring and heating were stopped and the solid material was allowed to settle for 48 hours. By decanting the solution above the precipitate, a solution of phenylmagnesiumchloride ($Ph_xMgCl_{2-x}$, reaction product XIII.A.) with a concentration of 1.36 mol Mg/l was obtained; which was used in the further catalyst preparation.

XIII.B. Preparation of the Mg-Containing Compound

About 460 ml of the solution of reaction product of step XIII.A (about 0.624 mol Mg) and 230 ml of a solution of tetraethoxysilane (TES) in dibutyl ether (DBE) (73 ml of TES and 157 ml of DBE) were dosed simultaneously to a mixing device of 0.45 ml volume supplied with a stirrer and jacket. Thereafter the premixed reaction product I.A and the TES-solution were introduced to a reactor. The mixing device (minimixer) and the feedpipes to it were cooled to 7.5° C. by means of cold water circulating in the minimixer's jacket and round the feedpipes The reagents contact time was 20 s in the minimixer and the connecting tube between the minimixer and the reactor. The stirring speed in the minimixer was 1000 rpm. The mixture formed in the minimixer was introduced to a 1.2 l reactor, with stirring. The reactor was loaded preliminary with 370 ml of DBE and 130 ml chlorobenzene, and heated at 35° C. Dosing time was 6 hours. The average stirring speed in the reactor was 415 rpm.

On the dosing completion the reaction mixture was heated up to 60° C. in 30 minutes and kept at 60° C. for 1 hour. Then the stirring was stopped and the solid substance was allowed to settle. The supernatant was removed by decanting. The solid substance was washed three times using 700 ml of heptane each washing. As a result, a pale yellow solid substance, reaction product XIII.B, was obtained, suspended in 300 ml of heptane.

XIII.C. Activation Step

In inert nitrogen atmosphere at 0° C. a 250 ml glass flask equipped with a mechanical agitator was filled with a slurry of 5 g of reaction product XIII.B dispersed in 60 ml of heptane. Subsequently a solution of 1.0 ml ethanol in 20 ml of heptane was added at 0° C. for 1 hour, resulting in a ratio ethanol/Mg=0.45. After keeping the reaction mixture at 0° C. for 30 minutes, a solution of 0.79 ml titaniumtetraethoxide (TET/Mg=0.1) in 20 ml of heptane was added at 0° C. in 1 hour, after which the slurry was slowly heated to 30° C. in 90 min and kept at that temperature for another 2 hours. Finally the supernatant liquid was decanted from the solid reaction product (about 5.5 g), which was washed once with 90 ml of heptane at 30° C. The slurry was kept at 30° C. for another 2 hours. Finally the supernatant liquid was decanted from the solid substance (about 5.5 g), which was washed once with 80 ml of heptane at 30° C. As a result, reaction product XIII.C was obtained, suspended in 15 ml of heptane.

XIII.D. Preparation of the Catalyst Component

This step was performed fully analogous to Example I.D; resulting in catalyst component suspended in heptane.

XIII.E. Polymerization of Propylene

Polymerization of propylene was carried out in a stainless steel reactor (with a volume of 12 l) in heptane (5.5 l) at a temperature of 70° C., total pressure 0.7 MPa and hydrogen presence (1.5% v/v in the headspace) for 1 hour in the presence of a catalyst comprising the catalyst component according to step XIII.D, triethylaluminium and diisobutyldimethoxysilane. The concentration of the catalyst component was 0.023 g/l; the concentration of triethylaluminium was 1.9 mmol/l and the concentration of diisobutyldimethoxysilane was 0.95 mmol/l.

Data on the catalyst performance during the propylene polymerization are presented in Table 2. The particles of the polymer powder obtained had a round shape and showed good flow behaviour.

Examples XIV-XXVI

Example XIII was repeated, be it that other activating compounds were used in step C, at molar ratio of activator(s) to Mg as listed in Table 2; together with results of propylene polymerization with the catalyst obtained.

Examples 1-14

Gas-Phase Co-Polymerization of Propylene and Ethylene

Gas phase co-polymerization of ethylene and propylene was carried out in a stainless steel reactor with a volume of 1.8 liter. The polymerization comprised two steps:
1) homopolymerization of propylene for 1 hour at a temperature of 70° C., at an overall pressure of 2.1 MPa, with a hydrogen concentration of 1% (v/v) in the presence of a catalyst system comprising a catalyst component as obtained in step D of the experiments as indicated in Table 3, triethylalumium and diisopropyldimethoxysilane. The amount of catalyst was 15 mg, the Al/Ti molar ratio was 270 and the Si/Ti molar ratio was 11.3. After the first hour the overall pressure was reduced to 1.43 MPa by venting the reactor. After reducing the pressure a gas mixture of oxygen and nitrogen (0.5% v/v $O_2$) was introduced using a flow of 50 normalized liter/h; dosing time was varied between 10 and 60 seconds to influence the amount of copolymer formed in the next step;

2) the second step of copolymerization was started by bringing the overall pressure back to 2.1 MPa with ethylene. This pressure was maintained for 1 hour by applying a flow of ethylene/propylene in a molar ratio of 0.5 at a temperature of 66° C. and hydrogen concentration of 0.6% (v/v).

Data on the catalyst performance during the co-polymerization with catalysts as prepared in above experiments are presented in Table 3; differences between experiments with –a and –b are resulting from different amounts of oxygen added between steps 1 and 2. The particles of all polymer powders obtained had a round shape and showed easy flow.

It is observed from the data in Table 3 that a catalyst system with an activated catalyst component, that has higher activity in propylene polymerisation, appears to show somewhat lower ethylene sensitivity than a conventional catalyst made without the present activation step. It can further be concluded that by varying the compounds used in the activation step, ethylene sensitivity can be affected. For example, catalysts made with titanium tetraethoxide and a carboxylic acid ester as activating compounds result in relatively higher ethylene incorporation in preparing a propylene-ethylene copolymer; and show better overall performance as compared to a non-activated catalyst.

Abbreviations and Measuring Methods:
Ti wt % is the weight content in % of titanium in the catalyst component
Activity $kg_{PP}/g_{cat}$ is the amount of polypropylene obtained per gram of catalyst component.
The weight percentage of atactic polypropylene ($^a$PP) was determined as follows: 100 ml of the filtrate (y ml) obtained in separating the polypropylene powder (x g) and the heptane was dried over a steam bath and then under vacuum at 60° C. That yielded z g of $^a$PP. The total amount of $^a$PP (q g) is: (y/100)*z.
The weight percentage of $^a$PP is: (q/(q+x))*100%.
The bulk density (BD) of the polypropylene powder was determined according to ASTM D1895.
The particles size distribution of PP powder expressed as span ((d90−d10)/d50) was determined according to ASTM D1921, method A;
RC is the rubber content (propylene-ethylene copolymer) in the polymer powder; RCC2 is the C2 (ethylene) content in the rubber part of the polymer. RC and $RCC_2$ were measured with IR spectroscopy, which was calibrated using NMR according to known procedures;
MFI is the melt flow index as measured at 230° C. with 2.16 kg load.

TABLE 1

| Experiment | Ti-content (wt %) | Activity $kg_{PP}/g_{cat}$ | $^a$PP (wt %) | BD (g/100 ml) | span |
|---|---|---|---|---|---|
| I | 2.0 | 14.9 | 0.5 | 46 | 0.4 |
| II | 2.1 | 15.6 | 0.6 | 47 | 0.3 |
| III | 2.2 | 13.2 | 0.7 | 47 | 0.3 |
| IV | 2.3 | 16.2 | 0.6 | 46 | 0.5 |
| V | 2.1 | 16.3 | 0.4 | 47 | 0.3 |
| VI | 2.0 | 18.6 | 0.5 | 46 | 0.3 |
| VII | 2.0 | 15.5 | 0.5 | 46 | 0.3 |
| VIII | 1.9 | 13.6 | 0.5 | 46 | 0.4 |
| IX | 2.0 | 16.0 | 0.4 | 47 | 0.5 |
| X | 2.2 | 14.8 | 0.4 | 46 | 0.4 |
| XI | 2.2 | 16.0 | 0.4 | 47 | 0.3 |
| XII | 2.1 | 15.0 | 0.5 | 46 | 0.3 |
| A | 1.8 | 11.4 | 0.5 | 47 | 0.3 |

TABLE 2

| Experiment | Activator(s) | Activator/Mg (molar ratio) | Activity $(kg_{PP}/g_{cat})$ | $^a$PP (wt %) | BD (g/100 ml) | MFI (g/10 min) |
|---|---|---|---|---|---|---|
| XIII | Ethanol; TET | 4.5/1/10 | 19.5 | 1.5 | 46 | 9.03 |
| XIV | Di-n-butylphthalate; TET | 1/1/10 | 15.1 | 1.1 | 43 | 7.4 |
| XV | Ethylacetate; TET | 1/1/10 | 13.1 | 1.8 | 43 | 10.3 |
| XVI | TET | 1/10 | 14.5 | 1.4 | 45 | 12.1 |
| XVII | Ethylbenzoate; TET | 1/1/6.3 | 14.8 | 0.8 | 45 | 8.2 |
| XVIII | Dibutylether; TET | 1/1/6.3 | 15.0 | 1.0 | 45 | 14.4 |
| XIX | n-hexanol; TET | 1/1/6.3 | 18.0 | 1.1 | 44 | 11.1 |
| XX | n-hexanol; TBT | 1/1/6.3 | 10.4 | 1.0 | 45 | 5.5 |
| XXI | n-hexanol; TiPT | 1/1/6.3 | 14.7 | 1.3 | 41 | 9.6 |
| XXII | IPA; TET | 1/1/6.3 | 16.5 | 1.4 | 46 | 10.5 |
| XXIII | DMA; TET | 1/1/6.3 | 13.5 | 1.2 | 44 | 10.4 |
| XXIV | THF; TET | 1/1/6.3 | 15.9 | 1.3 | 44 | 16.0 |
| XXV | Pyridine; TET | 1/1/6.3 | 13.5 | 1.2 | 43 | 10.2 |
| XXVI | DiPDMS; TET | 1/1/6.3 | 11.4 | 1.0 | 47 | 13.4 |

TABLE 3

| Experiment | Catalyst from experiment | RC (% m/m) | $RCC_2$ (% m/m) |
|---|---|---|---|
| 1-a | XIII | 32.6 | 43.8 |
| 1-b |  | 18.7 | 48.0 |
| 2-a | XIV | 24.5 | 48.7 |
| 2-b |  | 13.9 | 52.4 |
| 3-a | XV | 52.1 | 46.1 |
| 3-b |  | 23.1 | 52.2 |
| 4-a | XVI | 44.9 | 44.2 |
| 4-b |  | 29.0 | 53.0 |
| 5-a | XVII | 37.2 | 45.1 |
| 5-b |  | 25.9 | 46.2 |
| 6-a | XVIII | 42.8 | 43.4 |
| 6-b |  | 23.9 | 45.6 |
| 7-a | XIX | 35.6 | 44.3 |
| 7-b |  | 20.5 | 45.3 |
| 8-a | XX | 31.2 | 43.6 |
| 8-b |  | 24.0 | 43.2 |
| 8-c |  | 7.5 | 46.7 |
| 9-a | XXI | 31.5 | 43.2 |
| 9-b |  | 9.3 | 45.8 |
| 10-a | XXII | 48.0 | 43.2 |
| 10-b |  | 26.7 | 42.9 |
| 11-a | XXIII | 34.6 | 44.5 |
| 11-b |  | 27.2 | 44.7 |
| 12-a | XXIV | 27.0 | 42.5 |
| 12-b |  | 11.9 | 44.7 |
| 13-a | XXV | 42.5 | 43.7 |
| 13-b |  | 21.6 | 47.0 |
| 14-a | XXVI | 31.6 | 44.8 |
| 14-b |  | 24.3 | 45.5 |

The invention claimed is:

1. A process for preparing a polymerization catalyst component comprising:
   i) contacting a compound $R^4_z MgX_{2-z}$ wherein $R^4$ is an organic group, X is a halide, and z is larger than 0 and smaller than 2, with an alkoxy- or aryloxy-containing silane compound to give a solid magnesium-containing compound of formula $Mg(OR^1)_x Cl_{2-x}$ wherein x is larger than 0 and smaller than 2, and each $R^1$, independently, represents an alkyl group;
   ii) contacting the solid $Mg(OR^1)_x Cl_{2-x}$ with a mixture of two activating compounds, one activating compound being an internal electron donor selected from the group consisting of carboxylic acids, carboxylic acid anhydrides, carboxylic acid esters, carboxylic acid halides, alcohols, ethers, ketones, amines, amides, nitriles, aldehydes, alkoxides, sulphonamides, thioethers, thioesters and organic compounds containing one or more hetero atoms selected from the group consisting of nitrogen, oxygen, sulphur and phosphorus and the other activating compound being a compound of formula $M(OR^2)_{v-w}(R^3)_w$, wherein M is Ti, Zr, Hf, Al or Si, each $R^2$ and $R^3$, independently, represent an alkyl, alkenyl or aryl group, v is the valency of M and w is smaller than v, in the presence of an inert dispersant to give an intermediate reaction product; and
   iii) contacting the intermediate reaction product with a halogen-containing Ti-compound wherein when the compound of formula $M(OR^2)_{v-w}(R^3)_w$ is titanium tetraalkoxide, then the internal electron donor is selected from the group consisting of carboxylic acids, carboxylic acid anhydrides, carboxylic acid esters, carboxylic acid halides, ethers, ketones, amines, amides, nitriles, aldehydes, alkoxides, sulphonamides, thioethers, thioesters and organic compounds containing one or more hetero atoms selected from the group consisting of nitrogen, oxygen, sulphur and phosphorus.

2. The process according to claim 1, wherein at least one of the $R^1$ groups represents an ethyl group.

3. The process according to claim 1, wherein the one activating compound is selected from the group consisting of carboxylic acids, carboxylic acid anhydrides, carboxylic acid esters, alcohols, ethers, and titanium tetraalkoxides.

4. The process according to claim 1, wherein M is Ti and the internal electron donor is a carboxylic acid ester.

5. The process according to claim 1, wherein at least one of the $R^2$ groups represents an ethyl group.

6. The process according to claim 1, wherein the dispersant is an aliphatic hydrocarbon.

7. The process according to claim 1, wherein the molar ratio of the mixture of the activating compounds to $Mg(OR^1)_x Cl_{2-x}$ is between 0.05 and 0.5.

8. A polymerization catalyst system comprising a catalyst component prepared by:
   i) contacting a compound $R^4_z MgX_{2-z}$ wherein $R^4$ is an organic group, X is a halide, and z is larger than 0 and smaller than 2, with an alkoxy- or aryloxy-containing silane compound to give a solid magnesium-containing compound of formula $Mg(OR^1)_x Cl_{2-x}$ wherein x is larger than 0 and smaller than 2, and each $R^1$, independently, represents an alkyl group;
   ii) contacting the solid $Mg(OR^1)_x Cl_{2-x}$ with a mixture of two activating compounds, one activating compound being an internal electron donor selected from the group consisting of carboxylic acids, carboxylic acid anhydrides, carboxylic acid esters, carboxylic acid halides, alcohols, ethers, ketones, amines, amides, nitriles, aldehydes, alkoxides, sulphonamides, thioethers, thioesters and organic compounds containing one or more hetero atoms selected from the group consisting of nitrogen, oxygen, sulphur, and phosphorus and the other activating compound being a compound of formula $M(OR^2)_{v-w}(R^3)_w$, wherein M is Ti, Zr, Hf, Al or Si, each $R^2$ and $R^3$, independently, represent an alkyl, alkenyl it aryl group, v is the valency of M and w is smaller than v, in the presence of an inert dispersant to give an intermediate reaction product; and
   iii) contacting the intermediate reaction product with a halogen-containing Ti-compound and a co-catalyst; wherein when the compound of formula $M(OR^2)_{v-w}(R^3)_w$ is titanium tetraalkoxide, then the internal electron donor is selected from the group consisting of carboxylic acids, carboxylic acid anhydrides, carboxylic acid esters, carboxylic acid halides, ethers, ketones, amines, amides, nitriles, aldehydes, alkoxides, sulphonamides, thioethers, thioesters and organic compounds containing one or more hetero atoms selected from the group consisting of nitrogen, oxygen, sulphur and phosphorus.

9. The catalyst system according to claim 8, wherein the co-catalyst is an organometallic compound containing a metal from group 1, 2, 12 or 13 of the Periodic System of the Elements, and the system further comprises an external electron donor.

10. A process of making a polyolefin by contacting at least one olefin with a polymerization catalyst system prepared by:
    i) contacting a compound $R^4_z MgX_{2-z}$ wherein $R^4$ is an organic group, X is a halide, and z is larger than 0 and smaller than 2, with an alkoxy- or aryloxy-containing silane compound to give a solid magnesium-containing compound of formula $Mg(OR^1)_x Cl_{2-x}$ wherein x is larger than 0 and smaller than 2, and each $R^1$, independently, represents an alkyl group;
    ii) contacting the solid $Mg(OR^1)_x Cl_{2-x}$ with a mixture of two activating compounds, one activating compound being an internal electron donor selected from the group consisting of carboxylic acids, carboxylic acid anhydrides, carboxylic acid esters, carboxylic acid halides, alcohols, ethers, ketones, amines, amides, nitriles, aldehydes, alkoxides, sulphonamides thioethers, thioesters and organic compounds containing one or more hetero atoms selected from the group consisting of nitrogen, oxygen, sulphur and phosphorus and the other activating compound being a compound of formula $M(OR^2)_{v-w}(R^3)_w$, wherein M is Ti, Zr, Hf, Al or Si, each $R^2$ and $R^3$, independently, represent an alkyl, alkenyl or aryl group, v is the valency of M and w is smaller than v, in the presence of an inert dispersant to give an intermediate reaction product; and
    iii) contacting the intermediate reaction product with a halogen-containing Ti-compound and a co-catalyst; wherein when the compound of $M(OR^2)_{v-w}(R^3)_w$ is titanium tetraalkoxide, then the internal electron donor is selected from the group consisting of carboxylic acids, carboxylic acid anhydrides, carboxylic acid esters, carboxylic acid halides, ethers, ketones, amines, amides, nitriles, aldehydes, alkoxides, sulphonamides, thioethers, thioesters, and organic compounds containing one or more hetero atoms selected from the group consisting of nitrogen, oxygen, sulphur and phosphorus.

11. The process according to claim 10, wherein the olefin is propylene or a mixture of propylene and ethylene.

12. The process according to claim 1, wherein contacting the solid $Mg(OR^1)_xCl_{2-x}$ with the mixture of two activating compounds occurs after contacting the compound $R^4{}_zMgX_{2-x}$ with the alkoxy- or aryloxy-containing silane compound.

13. The process according to claim 1, wherein there is no contact with the halogen containing Ti-compound before contacting the solid $Mg(OR^1)_xCl_{2-x}$ with the mixture of two activating compounds.

\* \* \* \* \*